US011015723B2

(12) United States Patent
Biwersi (10) Patent No.: US 11,015,723 B2
(45) Date of Patent: May 25, 2021

(54) DIRECTIONAL VALVE COMPRISING A DAMPING SYSTEM FOR CONTROLLING A TORQUE MOTOR OF A CONSTRUCTION MACHINE

(71) Applicant: HYDAC SYSTEMS & SERVICES GMBH, Sulzbach/Saar (DE)

(72) Inventor: Sascha Alexander Biwersi, Mettlach (DE)

(73) Assignee: HYDAC SYSTEMS & SERVICES GMBH, Sulzbach/Saar (DE)

( * ) Notice: Subject to any disclaimer, the term of this patent is extended or adjusted under 35 U.S.C. 154(b) by 0 days.

(21) Appl. No.: 16/336,969

(22) PCT Filed: Aug. 31, 2017

(86) PCT No.: PCT/EP2017/001033
§ 371 (c)(1),
(2) Date: Mar. 27, 2019

(87) PCT Pub. No.: WO2018/059727
PCT Pub. Date: Apr. 5, 2018

(65) Prior Publication Data
US 2019/0219177 A1 Jul. 18, 2019

(30) Foreign Application Priority Data
Oct. 1, 2016 (DE) ..................... 10 2016 011 860.1

(51) Int. Cl.
*F16K 11/07* (2006.01)
*F15B 13/04* (2006.01)
*F15B 11/10* (2006.01)

(52) U.S. Cl.
CPC ............. *F16K 11/07* (2013.01); *F15B 11/10* (2013.01); *F15B 13/0402* (2013.01);
(Continued)

(58) Field of Classification Search
CPC .. F15B 11/10; F15B 13/0402; F15B 13/0407; F15B 2211/253; F15B 2211/30535;
(Continued)

(56) References Cited

U.S. PATENT DOCUMENTS 3,238,722 A * 3/1966 Berkman ................ E02F 9/123
60/414
3,370,613 A * 2/1968 Weaver ................... F15B 13/12
137/625.69
(Continued)

FOREIGN PATENT DOCUMENTS

DE         33 35 469       4/1985
DE    10 2005 049 839     10/2006
(Continued)

OTHER PUBLICATIONS

International Search Report (ISR) dated Jan. 5, 2018 in International (PCT) Application No. PCT/EP2017/001033.

*Primary Examiner* — Angelisa L. Hicks
(74) *Attorney, Agent, or Firm* — Wenderoth, Lind & Ponack, L.L.P.

(57) ABSTRACT

A valve includes a valve housing (33), which has at least one service connection (A, B), a pressure supply connection (P) and a return connection (T). In the valve housing (33), a control slide (STS) is guided so as to be movable longitudinally to control these individual connections. The supply pressure, which is applied to the pressure connection (P) to control a consumer (10, 12), connected to the service connection (A; B), is guided across at least one control side (56) of the control slide (STS) via an orifice plate (54) and a control channel (50). The control side (56) is positioned in a control chamber (58) in the valve housing (33) such that it can move. The control chamber (58) is connected to the return connection (T) via an additional orifice plate (59).

9 Claims, 5 Drawing Sheets (52) U.S. Cl.
CPC ...... *F15B 13/0407* (2013.01); *F15B 13/0417* (2013.01); *F15B 2211/253* (2013.01); *F15B 2211/30535* (2013.01); *F15B 2211/329* (2013.01); *F15B 2211/428* (2013.01); *F15B 2211/7058* (2013.01); *F15B 2211/8613* (2013.01)

(58) Field of Classification Search
CPC ........ F15B 2211/428; F15B 2211/7058; F15B 2211/8613; F16K 11/07; F16K 11/0716
See application file for complete search history.

(56) References Cited

U.S. PATENT DOCUMENTS

| | | | | |
|---|---|---|---|---|
| 3,921,672 | A | * | 11/1975 | Arnold ................. F16L 55/027 138/42 |
| 3,980,001 | A | * | 9/1976 | Cyphelly ............ F15B 13/0402 91/420 |
| 4,577,645 | A | * | 3/1986 | Calkins ..................... A24F 1/22 131/196 |
| 4,860,792 | A | * | 8/1989 | Ichihashi ............ F15B 13/0402 137/596.17 |
| 5,284,220 | A | * | 2/1994 | Shimizu .............. F15B 13/0402 137/330 |
| 5,785,087 | A | | 7/1998 | Takahashi et al. |
| 6,021,813 | A | | 2/2000 | Imhof et al. |
| 9,702,481 | B2 | * | 7/2017 | Hunnicutt ........... F15B 13/0402 |
| 2014/0271066 | A1 | * | 9/2014 | Hou ........................ F15B 11/17 414/408 |
| 2015/0096619 | A1 | * | 4/2015 | Greenwood .......... F15B 13/015 137/1 |

FOREIGN PATENT DOCUMENTS

| | | | |
|---|---|---|---|
| DE | 10 2013 021 317 | 6/2015 | |
| DE | 102013021317 A1 * | 6/2015 | .......... F16K 11/0716 |
| EP | 0 800 003 | 10/1997 | |
| JP | 3-41286 | 4/1991 | |

* cited by examiner

Fig.10

DIRECTIONAL VALVE COMPRISING A DAMPING SYSTEM FOR CONTROLLING A TORQUE MOTOR OF A CONSTRUCTION MACHINE

FIELD OF THE INVENTION

The invention concerns a valve comprising a valve housing having at least one service connection, one pressure supply connection and one return connection. Inside the valve housing, a longitudinally moveable control slide is guided so as to control the individual connections. The invention concerns, furthermore, a valve device with a valve of such a design.

BACKGROUND OF THE INVENTION

DE 10 2013 021 317 A1 discloses a hydraulic valve device, in particular in form of a load-sensing directional valve, with fluid connections provided on a housing arrangement, such as at least one pressure supply connection, at least one service connection and preferably a load-sensing connection with a control slide. The control slide is moveable in order to at least partially control the fluid connections of the housing arrangement in one or the other directions. An adjustable end-stop device is provided that limits the stroke length of the displacement movement of the control slide in one and the other directions.

A significant feature of the known solution lies in the fact that the end-stop device is provided at the same axial end section of the control slide with an end-stop surface that faces the one displacement direction. A second end-stop surface faces the other displacement direction. Each end-stop surface is provided with a counter stop, both of which are position-adjustable and disposed in the same respective end section of the housing arrangement. Not only are both counter stops accessible from one side of the housing, but they also act directly on the control slide, that is, without any mechanical intermediary elements. Thus, the counter stops are only subjected to tension or compression forces, which excludes any noticeable deformation or strength problems. The end-stop device is therefore not only easy and convenient to adjust but also provides for high adjustment accuracy.

Such load-sensing directional valves are also used for oscillation-prone applications in mobile machinery, for example in form of slewing gears on cranes or excavators. In this instance, the slewing gear takes the form of a conventional hydraulic motor, which is to be connected as hydraulic user to the respective service connection of the valve. Generally speaking, the load at the user side of the valve is, from a process control point of view, a PT2-element, having capacities at the inflow and discharge side, largely formed by the oil volumes in the supply and discharge lines to the user and a sluggish rotational mass, which usually is the mass of the slewing gear to be moved. In comparison, the movement of linear masses, for example via conventional hydraulic cylinders, must be equally regarded as a PT2-element.

If the control slide of conventional load-sensing valves, such as load-sensing directional valves, is opened suddenly in such oscillation-prone applications, a pressure compensator, placed hydraulically upstream of the valve, is used after a short time to stimulate the PT2-element with a constant volume flow, which leads to oscillations in the hydraulic fluid system. In particular, the volume flow of the motor (Q-motor) is in this instance representative for the speed of the slewing gear, which results in moderately dampened oscillations in the entire system, and which is also noticeable in the volume flow at the return orifice of the valve. Depending on the level of dampening present in the system, this system may result in significant and difficult to contain torsional oscillations. Since, as already described, the return volume flow at the return orifice follows analogous to the oscillation, it will be evident for the average professional in the field of such hydraulic control systems in oscillation-prone applications to install lowering brake check valves into the return line of the valve to ensure a constant volume flow in the return line. The disadvantage here is that the degree of dampening of the PT2-element itself is not changed, which means that the improvement in the overall system is minimal. Moreover, the additional valves incur extra expenses and cause unintended pressure losses in the system.

A further option to improve the oscillation tendency of hydraulic user systems is to use valves with load-feedback. In this solution, the connections in the control slide are on the one hand the load-sensing signal, which is common practice with many other load-sensing valves, and on the other hand the feedback of the load pressure to that end face of the control slide that is not subjected to the control pressure. The connection is then a pressure distributor circuit that reduces the load pressure to a load-sensing signal, then reduces it further and supplies it to the opposite end face and finally feeds it via a return connection inside the valve towards the tank. It follows from this that the control slide is closed proportionally to the load pressure. As soon as the first load peak in the oscillation, caused by the supply volume flow of the motor, builds up, the volume flow is reduced and prevents an overshooting of the slewing gear on the load-side of the valve, which induces the oscillation in the first place. To this extent a load pressure-dependent, desired damping is achieved through this known solution.

The disadvantage, nevertheless, is that a volume flow is withdrawn from the load-sensing signal, which, in combination with the pressure compensator additionally reduces the volume flow, which is usually due to the reduction of the control-$\Delta p$. It is not sensible in this instance to obtain damping via the controller gain, that is, the control-$\Delta p$ of the pressure compensator, since it can cause instability depending on its own momentum. To achieve progressive characteristics of the control slide (small orifice change in the lower range of the opening stroke), the damping action in the lower range is achieved solely via the reduction of the control-$\Delta p$. The volume flow for achieving the damping effect is withdrawn from the load, which makes an accurate speed setting impossible even if the control slide position is accurately determined by a sensor.

SUMMARY OF THE INVENTION

Based upon said prior art, an object of the invention to provide an improved damping system for valves, in particular for oscillation-prone applications as they occur in mobile machinery, which helps to avoid the above-described disadvantages.

This object is basically met by a valve bearing as well as a valve device according to the invention.

A significant feature of the valve solution according to the invention lies in the fact that the supply pressure at the pressure supply connector is connected to control a user that is connected to the respective service connection of the valve via an orifice plate to a control channel to at least one control side of the control slide. The control slide is moveably disposed in a control chamber inside the valve housing, and is connected via a further, second orifice plate to the return flow connection of the valve. The basic idea of the valve solution according to the invention is then realized. The idea of this invention is not to use the load-sensing pressure for damping as usual, but to use the supply pressure that is present at the pressure supply connector of the valve, so that the control element in form of the pressure compensator, which is disposed upstream of the valve, is not negatively affected by the damping action.

In this instance the valve device according to the invention presumes, according to the invention, that the pressure compensator, which is disposed upstream of the valve, receives its supply pressure from a swivel angle pump that may be controlled by way of a load-sensing pressure. Also, oscillation-prone hydraulic user, such as a motor-driven slewing gear, is disposed downstream of the valve, is present.

In a particularly preferred embodiment of the valve according to the invention, at least one further service connection is present in the valve housing. Also, the first orifice plate is connected via the control channel to a third orifice plate that, when pressure is supplied to the one service connection, leads to the respective other service connection for a fluid return, and causes, in front of a return control edge in the direction of the return connector, a pressure increase in the respective other service connection of the two service connections of the valve. Especially in the instance of small volume flows, and to obtain precision control curves, a bypass connection from the supply pressure, present at the pressure supply connector, to the load is provided at the respective service connection so that the pressure upstream of the return flow orifice of the valve rises more quickly and in this manner works against the overshooting of the load.

In the solution according to the invention, the volume flows utilized for dampening are not withdrawn from the load connected to the valve. This use makes an accurate speed setting possible for the hydraulic user, for example in form of a slewing gear. If a position sensor is used to determine the position of the control slide, it is possible to derive from it the exact speed of the function.

The above-described idea is not limited to load-sensing valves, but may also be used for correspondingly designed throttle valves.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale:

FIGS. 9 and 10 are graphs related to those in FIGS. 7 and 8, respectively, depicting the corresponding angular velocity (broken line) of a connected hydraulic user beside the respective supply volume flow (full line), wherein FIG. 9 depicts a solution according to the prior art, and FIG. 10 shows the conditions with the valve solution according to the invention.

DETAILED DESCRIPTION OF THE INVENTION

Figure 1:
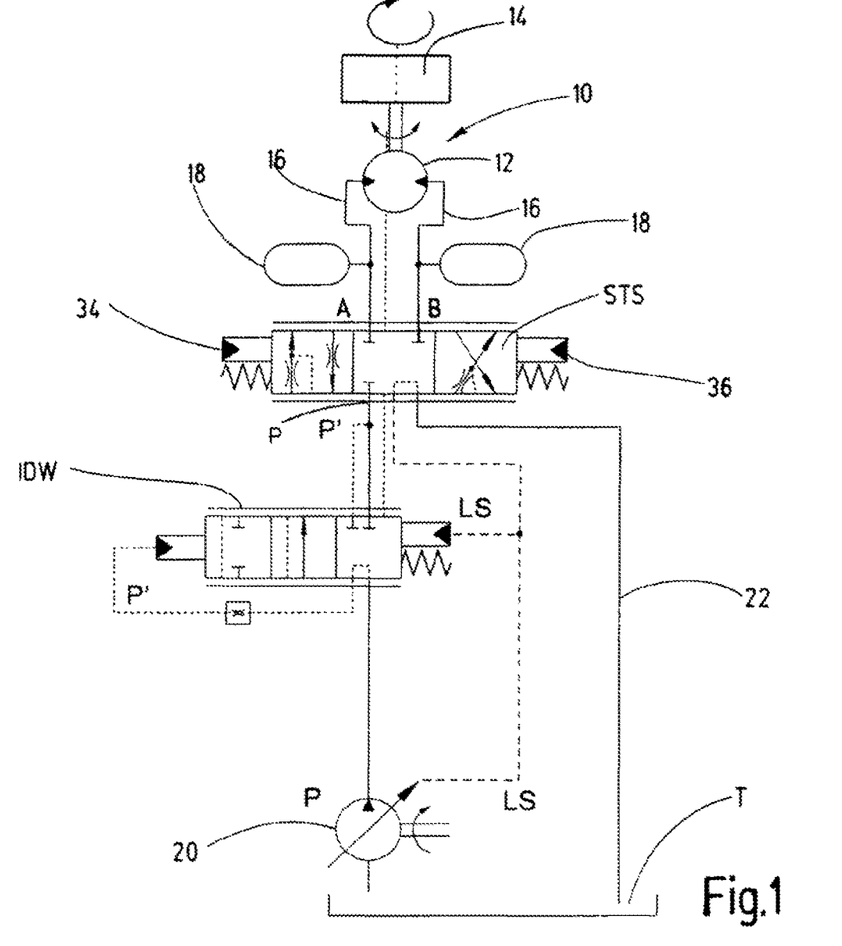
FIG. 1 is a hydraulic circuit diagram of a valve device according to an exemplary embodiment of the invention.

FIG. 1 depicts a valve device for controlling a slewing gear 10 in form of a hydraulic circuit diagram that is used for mobile machinery, for example on a crane or excavator. The slewing gear 10 comprises a hydraulic motor 12 that may be controlled in both rotating directions, and is able to move a load 14 in opposite rotational directions. The load 14 may, for example, be a crane arm or excavator arm that is not shown in detail. The hydraulic motor 12 is connected via supply and discharge lines 16 to an output side of a valve via the service connections A, B, as shown in greater detail in FIGS. 2 to 4. Generally speaking, the load at the user side of the valve shown is, from a process control point of view, a PT2-element, having capacities 18 disposed at the inflow and discharge side for the hydraulic motor 12. The capacities are largely formed by the oil volumes in the supply and discharge lines 16, and have a sluggish rotational mass usually being the mass of the slewing gear to be moved, including the attached load 14. An individual pressure compensator IDW is connected hydraulically upstream of the valve with the control slide STS. The pressure compensator provides a control pressure P' at a pressure supply connector P of the valve. The pressure compensator IDW is supplied by a swivel angle pump 20, which may be controlled by a load-sensing pressure LS, which provides a pump supply pressure P. The valve with the control slide STS is connected via a return line 22 to a tank T from which the swivel angle pump 20 takes the supply fluid for the hydraulic motor 12.

The valve with the control slide STS shown in FIG. 1 will now be explained in detail by way of FIGS. 2 to 4. Of the housing arrangement 24, the FIG. 2 only depicts the main housing components that functionally interact with the hydraulic valve control facility. Housing arrangement 24 includes a control housing 26 in which the control slide STS is moveable along an axis 28, as well as housing end sections 30 and 32 that close off the control housing 26 at both axial ends. All of these housing components together form valve housing. As is common practice with valve devices of this kind, the control housing 26 is provided with individual housing connectors, such as a pressure supply connector P, two service connectors A and B as well as two tank or return flow connectors T. Connectors T lead via at least one return flow line 22 to the tank T, and thus, have the same designation. If, according to the representation in FIG. 1, the output side of the pressure compensator IDW still provides the supply pressure P', the same is present at the pressure supply at the pressure supply connector P of the valve according to FIGS. 2, 3.

Figure 2:
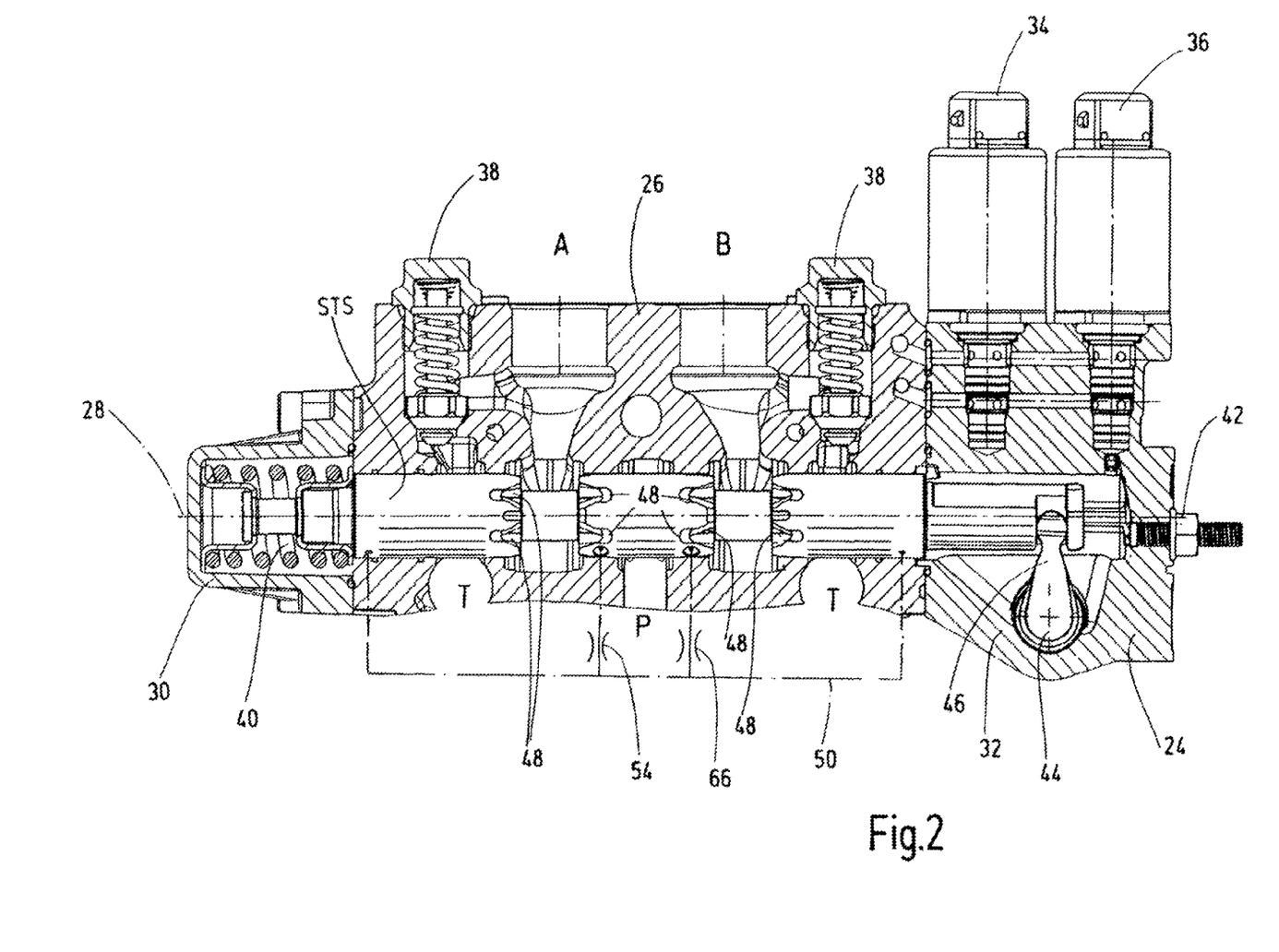
FIGS. 2 and 3 are side views in section through the essential components of a valve according to the valve device in FIG. 1 in two different valve positions.

The control slide STS of the control device or the valve according to FIG. 2, respectively, as such may be controlled in the usual manner by electromagnetically operable pilot valves 34, 36, which are known per se and are thus not described in any detail. Moreover, spring-loaded check valves 38 are screwed into the control housing 26, each assigned to the respective service connection A and the service connection B. Each check valve acts as a pressure limiting or safety valve. As depicted in FIG. 2, a spring arrangement or spring 40, disposed in the housing end section 30, provides a neutral or central positioning for the control slide STS, as is common practice in such directional valves. In the neutral or central position shown in FIG. 2, the pressure supply connector P is separated from the service connectors A, B, and those service connectors A, B from the tank or return flow connections T. At the axial end section 32, seen on the right when viewing FIG. 2, an adjustable end-stop device or stop 42 is provided to limit the stroke length of the control slide STS. Furthermore, the control slide STS may be operated by hand via a lever (not shown in detail), which engages from the outside with a rounded actuator head 44, which in turn engages via a protruding lever 46 with the control slide STS to be able to move the same manually, if necessary.

Figures 3, 4:
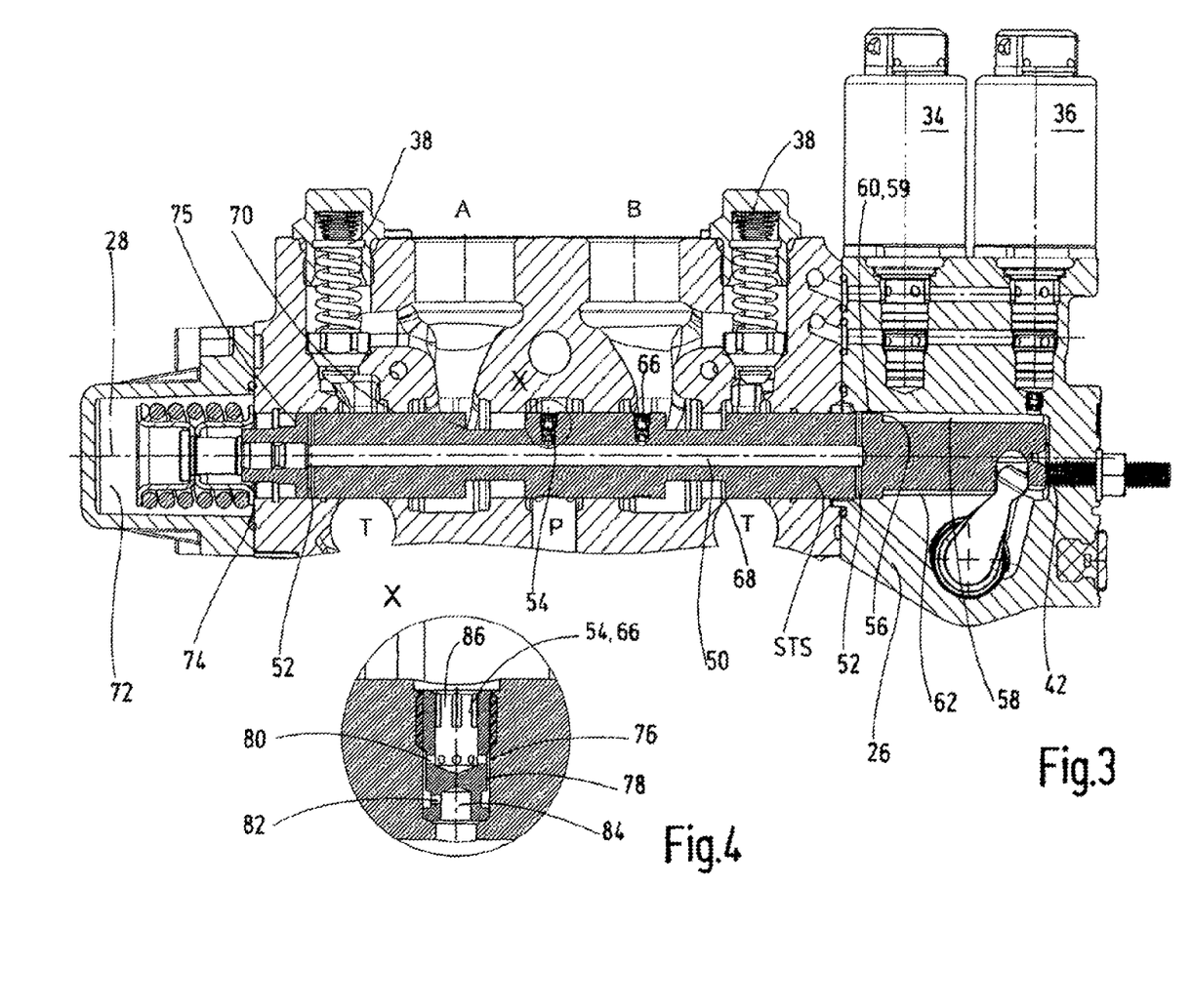
FIG. 4 is an enlarged, partial side view in section concerning the representation of an orifice in a circle marked with X in FIG. 3.

The representation according to FIG. 3 corresponds essentially to the valve solution in FIG. 2 with the exception that the control slide STS is located at its right-most end-stop position at the end-stop device 42. In this control slide position as per FIG. 3, a fluid-conducting connection is established between the pressure supply connector P and the service connector A, and the service connector B is in fluid-conducting connection with the return flow connector T on the right side when viewing FIG. 3. The return flow connector T on the left is blocked towards the service connector A through the control slide STS. Individual control recesses 48, which are disposed on the outer circumference of the control slide STS, are provided to make the media or fluid-conducting connections. The control recesses 48 interact with the control edges on the inside of the control housing 26 in the respective sections. Moreover, a control channel or longitudinal channel 50, which is at each end provided with a transverse channel section 52, is disposed coaxial to the longitudinal axis 28 inside the control slide STS.

Figure 6:
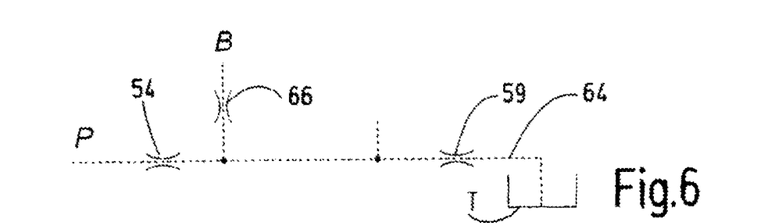

As is furthermore apparent from FIG. 3, the supply pressure P' present at the supply pressure connector P, which originates from the pressure compensator IDW (individual pressure compensator), is, for the purpose of controlling the service connection A, conducted via a first orifice plate 54, shown enlarged in FIG. 4, and the control channel 50, as well as the transverse channel section 52, to the right-hand control side 56 of the control slide STS. The control side 56 is moveably disposed in the right-hand housing end section 32 as part of the valve housing. The control chamber 58 is connected to the return flow connector T via a further orifice plate 59, which will later also be called third orifice plate 59. The third orifice plate 59 is in particular also shown in FIG. 6, and according to the representation in FIG. 3 it is formed by a section 60, which has a slightly reduced diameter compared to that of the wall of the valve housing, between the right-hand transverse channel section 52 and the diameter 62 of the control slide STS, which is reduced by one step. The connection between the control chamber 58 and tank T is established via a corresponding tank return flow line 64, as is shown in FIG. 6 in principle. When applying pressure to service connector A and releasing it from service connector B, the hydraulic motor 12 rotates the slewing gear 10 in clockwise direction U, for example.

As already described, a further service connection B is provided in the valve housing 33, which is supplied with fluid of a predeterminable pressure when the control slide STS is moved in the opposite direction. With renewed activation of the hydraulic motor 12 in the opposite direction, a swiveling of the slewing gear 10 together with the attached load in the opposite rotational direction is caused, as described above, that is, in the counter-clockwise direction U. As is further apparent from FIG. 3, a further, other orifice plate 66, which will from now on be called the second orifice plate 66, is connected via the control channel 50 to the first orifice plate 54. The first orifice plate 54 is identical to the second orifice plate 66, so that the latter also corresponds to the representation in FIG. 4. In the instance where pressure is applied to service connection A, as shown in FIG. 3, the second orifice plate 66 feeds into the respective other service connection B, establishing a fluid return, and causes, upstream of a return control edge 68, a pressure increase in the valve housing 33 in the direction of the right-hand side return flow connection T at the location of the service connection B.

If, contrary to the representation in FIG. 3, the control slide STS is moved further to the left when viewing this Figure, the depicted orifice 54 takes over the function of orifice 66 for the service connection A that is to be relieved, and the orifice 66 takes over the function of orifice 54 of supplying pressure, starting from the pressure supply connection P, in the direction of the service connection B. Thus, the orifice 54 takes over the function of orifice 66 and controls, via a further return flow control edge 70, the return flow from service connection A in the direction of the left return flow connection T. Particularly in the range of small volume flows, this arrangement provides a bypass via the orifices 54 and 66 from the pressure supply connection P to the load in form of a slewing gear 10 with the result that the pressure in front of the respective return flow orifice in form of the control edges 68 and 70 respectively increases more rapidly, and thus, is able to counter the overshooting of the load. This arrangement has no equivalent in the prior art.

To function in this manner, the pressure supply connection P is disposed between the one, first orifice plate 54 and the other, second orifice plate 66 centrally in the valve housing, with the control slide STS in neutral position. In this neutral position, all connections are separated from each other, which is apparent from the symmetrical arrangement of the orifices 54, 66 relative to the pressure supply connection P of the valve according to the representation in FIG. 2. Wherever this application mentions orifice plates, this also includes restrictors as function element. Moreover, the control channel 50 in the depiction of FIG. 2 is disposed outside the control slide STS, which in principle is also possible.

It is self-evident, when the control slide STS is moved into its left end-position, a further control chamber 72 is created, which receives fluid via the further, fourth orifice plate 74 as soon as the left transverse channel section 52 leads into the further control chamber 72. Comparable to the representation in FIG. 6, there is also in this instance drainage of fluid, but this time via the service connection A and the orifice 54 in the direction of the fourth orifice plate 74. The conditions are shown also in this respect, which are similar to those for the valve slide STS in the right-hand position. To that extent the control slide STS also has on its left side a further control side 75 disposed at its end face.

As is, furthermore, apparent from FIG. 4, each of the one orifice plate 54 and the other orifice plate 66 is formed by a screw-mounted component screwed into the control slide STS from the outside thereof. In this manner a fluid connection is established via the respective orifice plate 54, 66 between the control channel 50 and the respective associated connection A, B in valve housing 33, depending on the movement direction of control slide STS to the right or the left. Each screw-mounted component forms with the wall 76 of the control slide STS a fluid path 78 between at least two throttling transverse boreholes 80, 82 disposed one above the other in the screw-mounted component. The respective transverse borehole 80, 82 in the screw-mounted component is therefore connected to a respective longitudinal borehole 84, 86 in the screw-mounted component, which leads with its ends that face away from each other in one instance into the control channel 50 in control slide STS and in the other instance, depending on the current displacement position of the control slide STS, either into the pressure supply connection P or into one of the service connections A, B.

Figure 5:
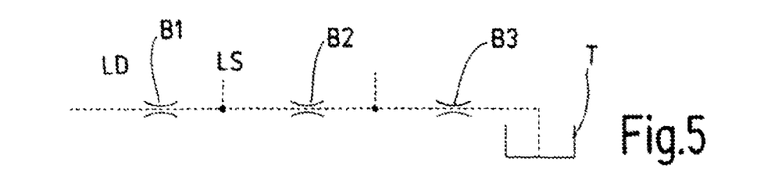
FIGS. 5 and 6 are hydraulic circuit diagrams of a pressure distributor circuit known in the prior art as load-feedback, and a pressure distributor circuit, respectively, according to the invention utilizing the valve of FIGS. 2 to 4.

The conditions shown in FIG. 3 are represented by way of example in the hydraulic circuit diagram of FIG. 6. Shown in contrast to this condition is a known pressure distributor circuit according to FIG. 5, which at the input side reduces a load pressure LD via an orifice B1 to a load-sensing signal LS, which in turn is led via a kind of orifice B2 to the opposite end face of the known valve slide, and from there ends up in the tank T at a reduced pressure via an orifice B3. The above-described orifices B1, B2 and B3 may also be formed by the valve design, and they do not necessarily have to exist as orifice plates in their own right. Although this formation results in the control slide STS being closed proportionally to a load pressure, and as soon as a first peak in load pressure starts to build up, the volume flow is reduced, and the slewing gear is prevented from overshooting, which induces the oscillation in the first place. A load pressure-dependent damping is then achieved. The disadvantages are, however, as already described, that the load-sensing signal is withdrawn from the volume flow and from the load.

Figure 7:
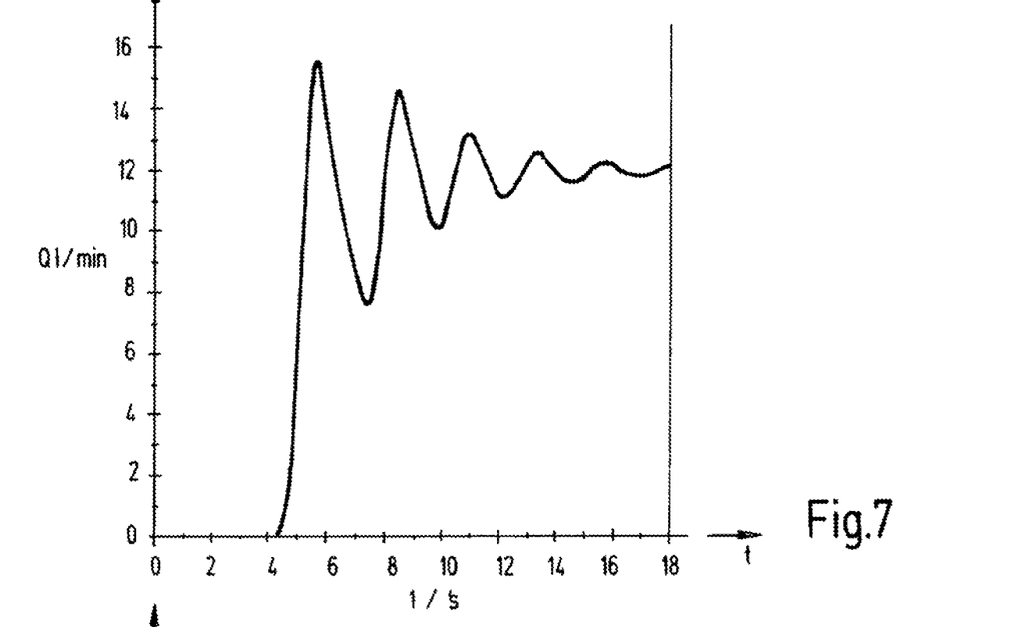
FIGS. 7 and 8 are graphs concerning the volume flow Q at the return flow orifice for a known valve solution as per the representation in FIG. 5 and, concerning the volume flow Q at the return flow orifice that relates to the valve solution as per the representation in FIG. 6.
Figure 8:
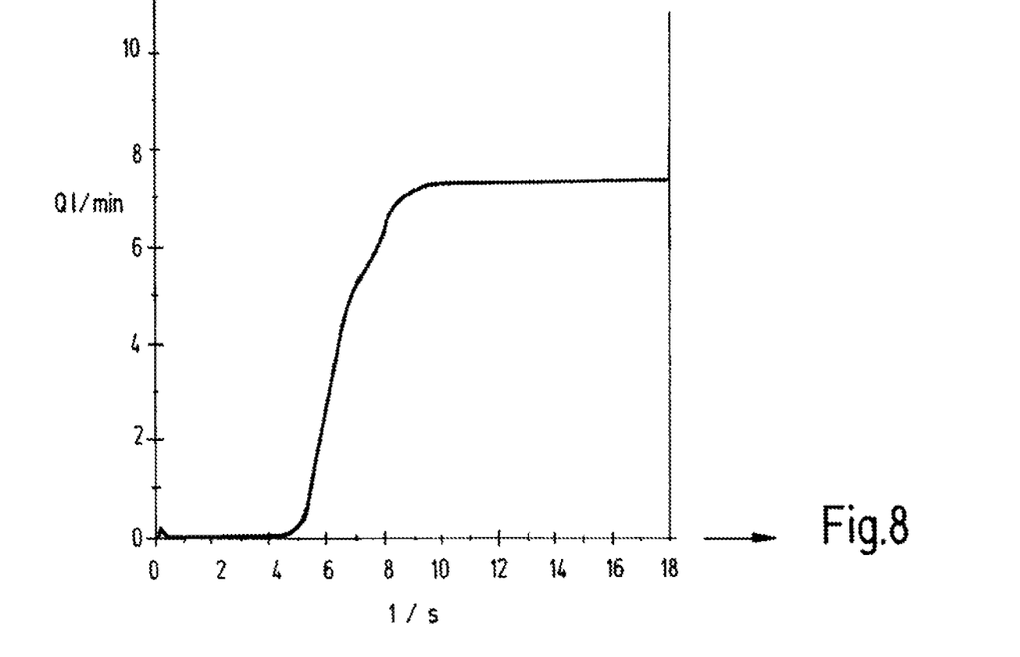
Figure 9:
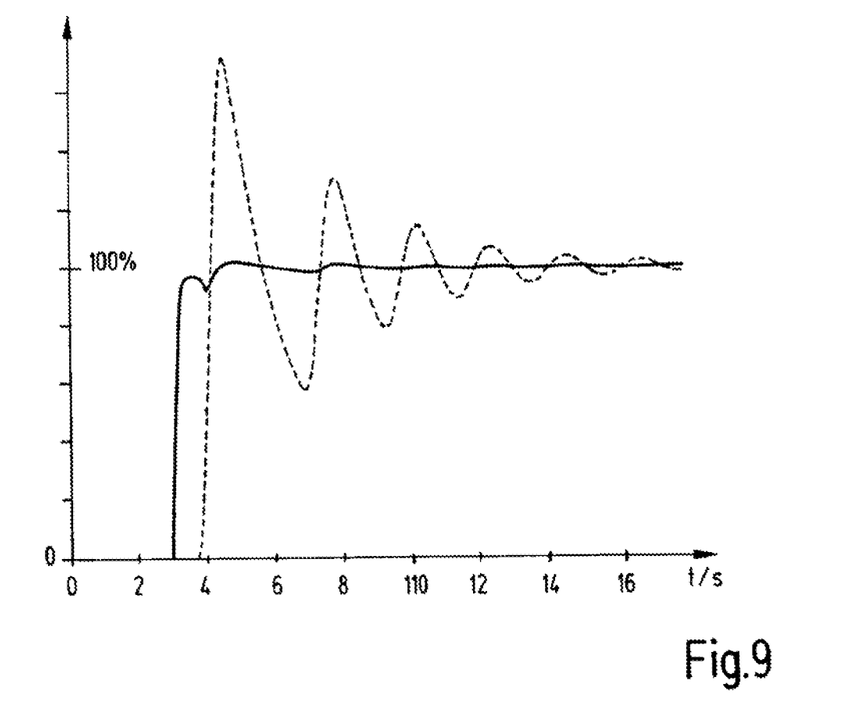
Figure 10:
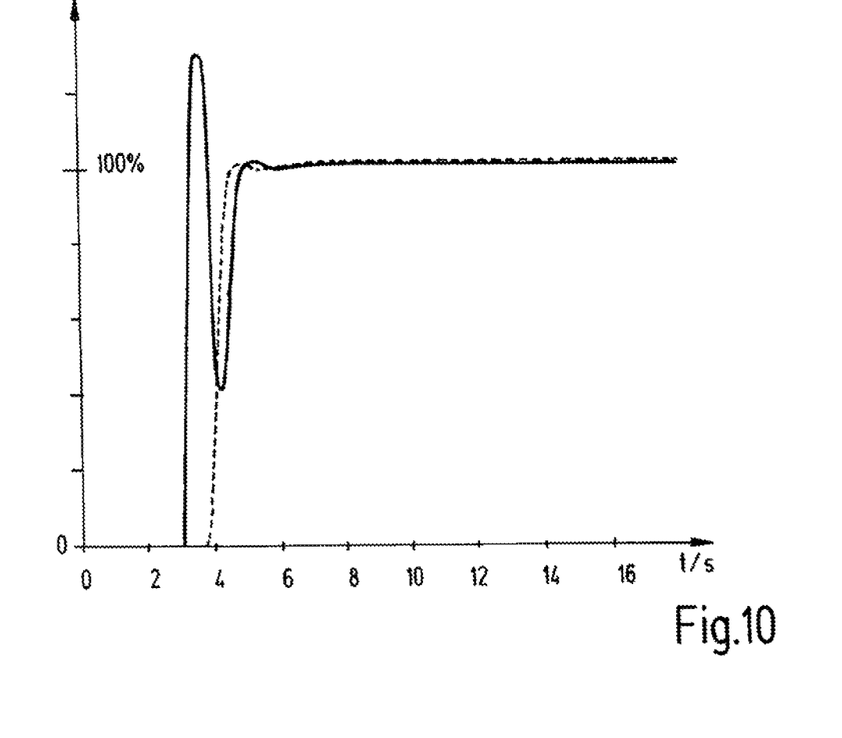

A step function response of this kind with a load-sensing valve according to the prior art for the described return flow orifice is depicted in FIG. 7 and shows how oscillation-prone known valve device solutions can be. In contrast, the representation in FIG. 8 shows a step function response using the valve according to the invention, again concerning the already described return flow orifices 68, 70 within the valve design. Furthermore, the FIGS. 9 and 10 respectively depict with a solid line the supply flow at one of the service connections A, B of a known valve and of the valve according to the invention to which the oscillation-prone hydraulic user is connected at its supply side. The solution according to the prior art shown in FIG. 9 demonstrates how the overshooting can occur for the user at the angular velocity relative to 100% as soon as the supply volume flow at the respective service connection A, B of the known valve increases. In contrast, according to the representation in FIG. 10 concerning the valve according to the invention, there is an initial overshoot (>100%) in the supply volume, followed by a transient oscillation without significant overshoot and followed by the angular velocity of the user. In this way particularly oscillation-prone users are protected from overshooting when hydraulically controlled by the valve according to the invention, and thus, is also improved and more accurately controllable.

Since the invention does not use the load sensing pressure to dampen the oscillation behavior, but the pressure P' at the pressure supply connection P of the valve, the control element pressure compensator IDW is hardly affected by this usage. Due to the dual orifice plates 54, 66, in particular for low volume flows, a bypass from the pressure supply side P of the valve to the load that is connected to the service connections A, B is provided so that the pressure in front of the respective return flow orifice 68, 70 increases more rapidly and acts against the overshooting of the load 14. According to this arrangement, a very cost-effective and functionally reliable dampening device has been provided for oscillation-prone, hydraulic applications.

While one embodiment has been chosen to illustrate the invention, it will be understood by those skilled in the art that various changes and modifications can be made therein without departing from the scope of the invention as defined in the claims.

The invention claimed is:

1. A valve, comprising:
a valve housing having first and second service connections, a pressure supply connection and a first return flow connection;
a control slide longitudinally moveable in said valve housing and controlling connecting and disconnecting of said first and second service connections to said pressure supply connection and said first return flow connection;
a control channel in said valve housing;
first, second and third orifice plates in said valve housing, said first orifice plate and said control channel connecting said pressure supply connection, which is connected in fluid communication to said first service connection to control a user coupled to said first service connection, in fluid communication to a control side of said control slide, said control side being movably disposed in a first control chamber inside said valve housing, said first control chamber being connected in fluid communication to said first return flow connection via said third orifice plate, said first orifice plate being connected in fluid communication via said control channel to said third orifice plate connected in fluid communication with said second service connection and then to said return flow connection when pressure from said pressure supply connection is supplied to said first service connection, thereby causing a pressure increase in said second service connection in front of a return control edge in a direction of said return flow connection, said control slide separating and blocking fluid communication between each of said first and second service connections, said pressure supply connection and said return flow connection in a neutral position of said control slide in said valve housing, said pressure supply connection being disposed between said first orifice plate and said second orifice plate in said valve housing in the neutral position of said control slide with said first and second orifice plates being covered by and sealed by said valve housing.

2. A valve according to claim 1 wherein
said first and third orifice plates are in fluid communication with a selected one of said first and second service connections and said pressure supply connection and said first return flow connection depending on a displacement position of said control slide in said valve housing.

3. A valve according to claim 1 wherein
said control channel extends through said control slide and has first and second channel ends with first and second transversely extending channel sections, respectively, said second channel section establishing a fluid connection between said first control chamber and said third orifice plate in a first end position of said control slide and in an opposite second end position of said control side toward a second control chamber located at an end of valve housing opposite said first control chamber, said second control chamber having an energy store therein biasing said control slide toward said second control chamber.

4. A valve according to claim 1 wherein
each of said first and second orifice plates comprise a screw-mounted component threaded into said control slide.

5. A valve according to claim 4 wherein
each said screw-mounted component forms with wall sections of said control slide a fluid path between first and second throttling transverse boreholes in each said screw-mounted component, each of said first and second throttling transverse boreholes being connected to first and second longitudinal boreholes, respectively, in each said screw-mounted component, each said first longitudinal borehole opening at an end thereof on said control channel in said control slide, each said second longitudinal borehole opening into said pressure supply connection or said first and second service connections dependent on a displacement position of said control slide in said valve housing.

6. A valve according to claim 1 wherein
first and second pilot valves, first and second pressure limiting valves, a manual operator and a second return flow connection are provided on said valve housing, said first and second return flow connections being assigned to said first and second service connections, respectively.

7. A valve according to claim 1 wherein
the valve is a load-holding valve or a throttle valve.

8. A valve according to claim 1 wherein
a pressure compensator is connected upstream of said pressure supply connection, said pressure compensator being connected in fluid communication upstream of a swivel angle pump to receive supply pressure from said swivel angle pump, said swivel angle pump being controlled a load sensing pressure; and
an oscillation-prone, hydraulic user is connected downstream from said first service connection.

9. A valve according to claim 8 wherein
said hydraulic user is a slewing gear.

\* \* \* \* \*